United States Patent
Faure

(10) Patent No.: US 11,539,691 B2
(45) Date of Patent: Dec. 27, 2022

(54) METHOD FOR IMPROVING USER AUTHENTICATION PERFORMED BY A COMMUNICATION DEVICE

(71) Applicant: THALES DIS FRANCE SA, Meudon (FR)

(72) Inventor: Frédéric Faure, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 268 days.

(21) Appl. No.: 16/759,949

(22) PCT Filed: Oct. 16, 2018

(86) PCT No.: PCT/EP2018/078300
§ 371 (c)(1),
(2) Date: Apr. 28, 2020

(87) PCT Pub. No.: WO2019/096521
PCT Pub. Date: May 23, 2019

(65) Prior Publication Data
US 2020/0344226 A1 Oct. 29, 2020

(30) Foreign Application Priority Data
Nov. 17, 2017 (EP) .................................. 17306601

(51) Int. Cl.
*H04L 29/06* (2006.01)
*H04L 9/40* (2022.01)
(Continued)

(52) U.S. Cl.
CPC ........... *H04L 63/0861* (2013.01); *G06N 3/04* (2013.01); *G06N 3/08* (2013.01); *H04W 12/06* (2013.01); *H04W 12/68* (2021.01)

(58) Field of Classification Search
CPC .. H04L 63/0861; H04W 12/06; H04W 12/68; G06N 3/04; G06N 3/08
See application file for complete search history.

(56) References Cited

U.S. PATENT DOCUMENTS 9,646,261 B2 * 5/2017 Agrafioti ................ G06V 40/10
11,132,427 B2 * 9/2021 Fong ...................... G06V 20/80
(Continued)

FOREIGN PATENT DOCUMENTS

WO 2017176356 A2 10/2017
WO 2017176356 A3 10/2017

OTHER PUBLICATIONS

PCT/EP2018/078300, International Search Report, dated Nov. 20, 2018, European Patent Office, P.B. 5818 Patentlaan 2 NL-2280 HV Rijswijk.
(Continued)

*Primary Examiner* — Chau Le
(74) *Attorney, Agent, or Firm* — The Jansson Firm; Pehr B. Jansson

(57) ABSTRACT

Method for improving user authentication efficiency performed by a communication device belonging to an authentication system. The communication device includes a local machine learning engine having a set of N artificial neural network ANN1,$i$ adapted to process N different types of input signals. The method includes the steps: receiving a first set of N input signals S_1($i$) for authentication purpose; determining respectively for each of the N input signals S_1($i$) by the N artificial neural networks ANN1,$i$, N estimations LH(i) of the likelihood that a given input signal is provided by a legitimate user; determining based on a risk scoring established using the N estimations LH(i) if the requesting user is authenticated as the legitimate user; if the requested user is authenticated, determining if at least one likelihood estimation determined for a given input signal
(Continued)

S_1(*j*) is below a predetermined threshold $T_{C,i}$, and if it is the case: transmitting the input signal S_1 (*j*) to a remote server implementing a server machine learning engine adapted to process said N different types of input signals and trained to identify a user U_C; receiving an input signal S_2(*j*) associated to the closest candidate U_C and executing by the local machine learning engine an additional learning phase using the input signal S_2(*j*) as an input signal that is not associated to the requesting user.

22 Claims, 2 Drawing Sheets

(51) Int. Cl.
*G06N 3/04* (2006.01)
*G06N 3/08* (2006.01)
*H04W 12/06* (2021.01)
*H04W 12/68* (2021.01)

(56) References Cited

U.S. PATENT DOCUMENTS

| | | | |
|---|---|---|---|
| 11,210,417 B2 * | 12/2021 | Wang | G06F 21/31 |
| 11,264,037 B2 * | 3/2022 | Lesso | G10L 17/10 |
| 2014/0188770 A1 * | 7/2014 | Agrafioti | A61B 5/7267 |
| | | | 706/13 |
| 2021/0326881 A1 * | 10/2021 | Handelman | G06N 20/00 |

OTHER PUBLICATIONS

PCT/EP2018/078300, Written Opinion of the International Searching Authority, dated Nov. 20, 2018, European Patent Office, D-80298 Munich.

* cited by examiner

METHOD FOR IMPROVING USER AUTHENTICATION PERFORMED BY A COMMUNICATION DEVICE

TECHNICAL FIELD

The present invention relates to a method for improving user authentication performed by a communication device. It is applicable to machine learning in a server computing environment.

BACKGROUND OF THE INVENTION

An Artificial Neural Network (ANN) is a computing system inspired by the animal brains. It is composed of a plurality of artificial neurons connected to each other's using artificial synapses. Artificial Neural Networks allow to implement machine learning algorithms having the ability to learn and improve themselves based on their experience.

A machine learning algorithm needs to be trained during a so-called learning phase. It is then operational and continues to adapt itself thanks to the reception of new stimuli.

Machine learning and artificial intelligence are considered of growing interest and these technologies can be implemented in a server computing environment.

Server computing generally refers to a network infrastructure allowing access to shared resources such as storage and applications. This encompasses what one is calling cloud computing. Server computing enables a local device, for example a personal computer connected to the internet, to access remotely to these shared resources. A user can therefore store its private data in one or several remote servers of the network infrastructure and/or benefit from an application software that is executed in the server and not in its local device.

For machine learning and artificial intelligence implemented in the server, the neural network can be permanently updated and improved thanks to the inputs of potentially an unlimited number of users using the server service.

There are existing solutions where the machine learning algorithms are implemented in the server. For example, technologies provided by Behaviosec and Unify ID are able to authenticate end user without any end user action. The machine learning technology analyses the behaviour of the user for authentication purpose.

The analysis of the user's behaviour can take into account the way the user is walking. For that purpose, a mobile application gets data from a microelectromechanical system (MEMS) and sends them to a remote server. The analysis can also take into account the characteristics of the user's sitting position. As an example, a dedicated device embedded in a seat generates data corresponding to the sitting position of the user and send it to a remote server. In addition, the way the user is driving can also be analyzed and reported to the server.

One drawback of this type of machine learning technology is that the devices which are configured to capture data need to be always online for reporting the captures data when available. This requires online connectivity which is not always available. For example, a device embedded in a car can be localized in an underground car park where online connectivity is not available.

SUMMARY OF THE INVENTION

This invention relates to a method for improving user authentication efficiency performed by a communication device belonging to an authentication system, the communication device comprising a local machine learning engine (LMLE) comprising a set of N artificial neural network ANN1,$i$ adapted to process N different types of input signals. The method comprises the following steps:

receiving a first set of N input signals S_1($i$) of different types provided by the requesting user for authentication purpose;

determining respectively for each of the N input signals S_1($i$) by the N artificial neural networks ANN1,$i$, N estimations LH($i$) of the likelihood that a given input signal is provided by a legitimate user allowed to access to at least a service provided by the communication device;

determining based on a risk scoring established using the N estimations LH($i$) if the requesting user is authenticated as the legitimate user;

if the requested user is authenticated, determining if at least one likelihood estimation determined for a given input signal S_1 ($j$) is below a predetermined threshold $T_{c,i}$, and if it is the case:

transmitting the input signal S_1 ($j$) to a remote server implementing a server machine learning engine (SMLE) adapted to process said N different types of input signals and trained to identify a user U_C, called closest candidate, different from the requesting user and for which the transmitted input signal S_1 ($j$) provides the best matching result, the remote server then providing an input signal S_2 ($j$) associated to the closest candidate U_C and of the same type as S_1 ($j$);

receiving the input signal S_2 ($j$) associated to the closest candidate U_C and executing by the local machine learning engine (LMLE) an additional learning phase using the input signal S_2 ($j$) as an input signal that is not associated to the requesting user.

According to an example, the N artificial neural networks ANN1,$i$ are trained during an initial learning phase applied prior to the additional learning phase at the time of setting up the access of the legitimate user to the communication device using a second set of input signals provided by the legitimate user.

According to an example, the method comprises the step applied after the initial learning phase of transmitting the second set of input signals to the server machine learning engine (SMLE) for training the server machine learning engine (SMLE).

According to an example, the second set of input signals is stored in a database where other sets of input signals provided by different users of the authentication system are also stored, these sets of input signals being used for setting up the additional learning phases of a plurality of communication devices belonging to the authentication system.

According to an example, at least one of the N input signals S_1($i$) is voice signal captured by a microphone of the communication device.

According to an example, at least one of the N input signals S_1($i$) is a gait signal representative of the user's gait.

According to an example, the gait signal is captured by a video camera capable of exchanging data with the communication device and installed in the user vicinity.

According to an example, at least one of the N input signals S_1($i$) is a fingerprint signal captured by a fingerprint sensor implemented on the communication device.

According to an example, at least one of the N input signals S_1($i$) is an environmental signals such as wireless network access point identifiers.

According to an example, the input signal S2(*j*) is received by the communication device without any identification information allowing the identification of the user to which it is associated.

The invention also relates to a communication device belonging to an authentication system, the communication device comprising a local machine learning engine (LMLE) comprising a set of N artificial neural network ANN1,*i* adapted to process N different types of input signals, the communication device being configured to:

- receive a first set of N input signals S_1(*i*) of different types provided by the requesting user for authentication purpose;
- determine respectively for each of the N input signals S_1(*i*) by the N artificial neural networks ANN1,*i*, N estimations LH(i) of the likelihood that a given input signal is provided by a legitimate user allowed to access to at least a service provided by the communication device;
- determine based on a risk scoring established using the N estimations LH(i) if the requesting user is authenticated as the legitimate user;
- if the requested user is authenticated, determining if at least one likelihood estimation determined for a given input signal S_1 (*j*) is below a predetermined threshold $T_{C,i}$, and if it is the case:
- transmit the input signal S_1 (*j*) to a remote server implementing a server machine learning engine (SMLE) adapted to process said N different types of input signals and trained to identify a user U_C, called closest candidate, different from the requesting user and for which the transmitted input signal S_1 (*j*) provides the best matching result, the remote server then providing an input signal S_2 (*j*) associated to the closest candidate U_C and of the same type as S_1 (*j*);
- receive the input signal S_2 (*j*) associated to the closest candidate U_C and execute by the local machine learning engine (LMLE) an additional learning phase using the input signal S_2 (*j*) as an input signal that is not associated to the requesting user.

The invention also relates to an authentication system comprising a communication device and a remote server comprising means for carrying out the steps of the method described above.

The invention also relates to a computer program product comprising instructions which, when the program is executed by a computer, cause the computer to carry out the steps of the method described above.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
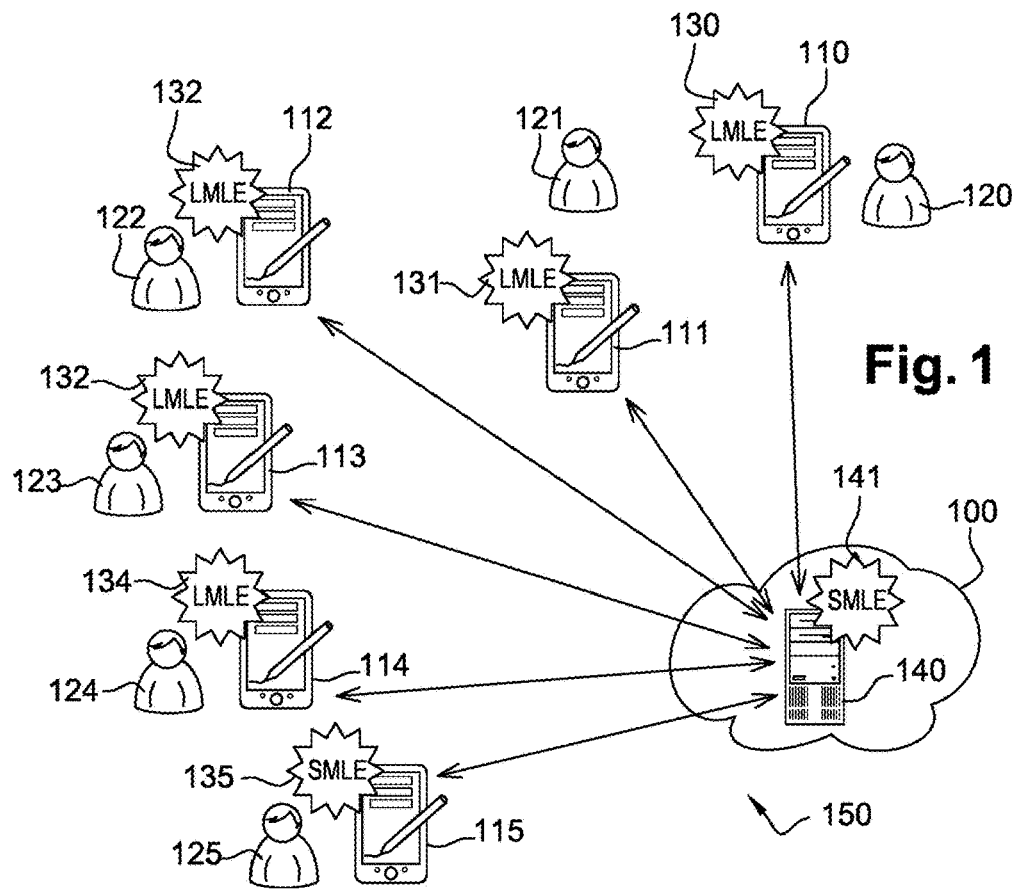
FIG. 1 is an example of a system implementing an authentication mechanism with a distributed machine learning engine.

FIG. 1 is an example of a system implementing an authentication mechanism with a distributed machine learning engine.

In order to access to a communication device 110-115 or to one or several services operated by this communication device 110-115, a user needs to be authenticated.

In this description, a user requesting the access to the communication device or to one or several services provided by this communication device is designated as a requesting user. A user who can legitimately access to a given communication device is designated as a legitimate user. An efficient authentication mechanism allows the legitimate user to be successfully authenticated whereas the authentication of a requesting user which is not entitled to access the communication device will fail.

The authentication system 150 implements an authentication mechanism using artificial intelligence. The authentication mechanism is implemented for each communication using two machine learning engines. For a given communication device, one machine learning engine 130-135 is implemented locally 110-115 and is called local machine learning engine LMLE. Another one 141 is implemented remotely in a server 140 of a server network 150 and is referred as the server machine learning engine SMLE. The authentication process is executed locally on the communication device thanks to the local machine learning engine at the edge of the server network.

The local machine learning engine LMLE 130-135 implemented in a given communication device 110-115 is able to authenticate the requesting user 120-125 autonomously at the edge of the server network. However, in order to improve the efficiency of the authentication, the server machine learning engine SLME 141 implemented in the remote server 141 is used. These two different machine learning engines when operated together form a distributed machine learning engine.

One aim is to adapt the local machine learning engine to slight changes of the profile of the authenticated user. The profile of a requesting user refers to a set of characteristics associated to this user for being authenticated by the communication device. One of these characteristic can be the user's voice. If the user's voice becomes hoarse, this change will be taken into account and the local machine learning engine LMLE will be adapted accordingly by cooperating with the server machine learning engine SLME.

Another aim of this distributed machine learning engine is to minimize the false positive ratio by taking into account data provided by all the users of the authentication system. The false positive ratio can be defined as the probability for a requesting user to be identified as a legitimate user despite the fact that the is not entitled to access to the communication device and/or to the one or several services provided by the communication device.

The local machine learning engine LMLE of a given communication device is not aware of the characteristics of the users of the authentication system 150 except those of the legitimate user entitled to use said given communication device. The local machine learning engine LMLE is trained using input signals provided by the legitimate user of the communication device. The main function of the local machine learning engine LMLE is to determine whether the requesting user is the legitimate user or not. For that purpose, the local machine learning engine LMLE is trained during a learning phase using input signals provided by the legitimate user.

Depending on the level of confidence with which the requesting user was authenticated, the server machine learning engine SMLE can be asked to provide the local machine learning engine with one or several input signals adapted to improve the efficiency of the authentication. This is achieved by using these provided input signals to train the local machine learning engine LMLE. These specific input signals are chosen by the server machine learning engine SMLE thanks to its knowledge of the other users of the authentication system.

Figure 2:
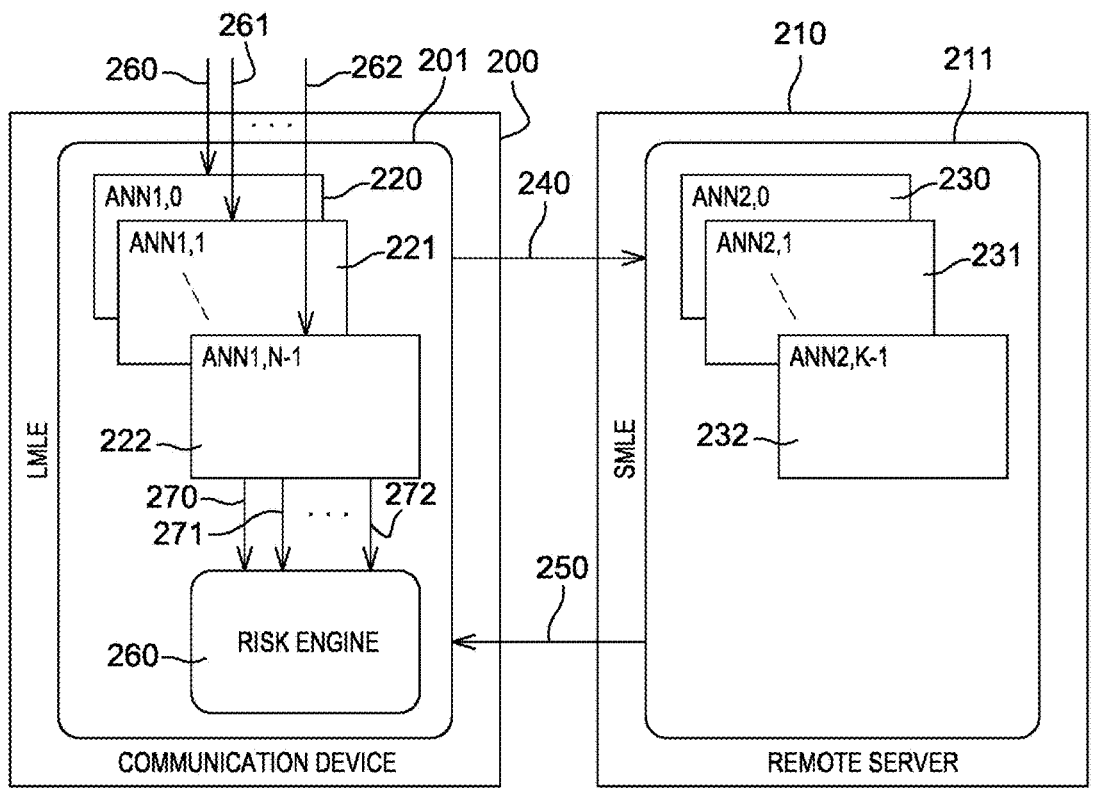
FIG. 2 illustrates the cooperation of a local machine learning engine with a remote machine learning engine for improving the user authentication efficiency.

FIG. 2 illustrates the cooperation of a local machine learning engine with a remote machine learning engine for improving the user authentication efficiency.

According to this example, a communication device 200 comprises a local machine learning engine LMLE 201 for authenticating a requesting user. This local machine learning engine LMLE 201 is configured to cooperate with a server machine learning engine SMLE 211 implemented in a remote server 210.

The authentication of the requesting user is performed by the local machine learning engine LMLE 201. For that purpose, N input signals are provided to a set of N artificial neural networks 220-222 noted ANN1,$i$ with $i \in [0,N-1]$.

Each of these artificial neural network is adapted to process a given type of input signal, for example one artificial neural network is adapted to process a signal carrying fingerprint data and one other artificial neural network is adapted to process a signal carrying an iris image of the requesting user.

For the local machine learning engine LMLE to be operable, the artificial neural networks ANN1,$i$ are trained by stimuli input signals. According to an example, these stimuli input signals are provided by the legitimate user during a learning phase designated in this description as the initial learning phase.

Once trained, a given artificial neural network of the local machine learning engine LMLE is able to estimate the likelihood 270-272 that an input signal of a given type is provided by the legitimate user for authentication purpose. As a plurality of input signals of different types is provided by the requesting user and processed by the artificial neural networks, a risk engine 260 implemented in the communication device 200 is able to consolidate the likelihood results 270-272 determined for each input signal and decide if the authentication succeeded or failed.

In case of a successful authentication, the risk engine is also configured to set up when required an additional learning phase in order to improve the efficiency of the authentication, in particular for improving the efficiency of a given ANN1,$i$ neural network. Therefore, according to this improved authentication mechanism, the local machine learning engine LMLE can be trained one or several times in addition to the initial learning phase. The initial learning phase is applied for example at the time of enrolling the legitimate user that is to say at the time of setting up the access of the legitimate user to the communication device. Then, one or several additional learning phases can be triggered latter on for improving the efficiency of the authentication.

According to an embodiment, the stimuli which are provided by the users of the authentication system for the initial learning phase are transmitted to the server machine learning engine SMLE or to a database accessible from the server machine learning engine SMLE. They can be used later on for setting up the additional learning phases.

When a requesting user is identified as the legitimate user, it is also verified how well it has succeeded. For that purpose, a criteria based on the likelihoods results 270-272 determined during the authentication of the requesting user can be defined. If it is fulfilled, one or several of the input signals provided by the requesting user for authentication purpose are transmitted 240 to the server machine learning engine SMLE 211 of the remote server 210. The server machine learning engine SMLE 211 comprises a set of K artificial neural networks 230-232 noted ANN2, $k$ with $k \in [0, K-1]$ and $K \geq N$. Each of these artificial neural networks is trained with a particular type of input signal, but one important difference with the artificial neural networks ANN1,$i$ implemented in the communication device 200 is that it has knowledge related to a plurality of users of the authentication system.

The K artificial neural networks 230-232 ANN2, $k$ with $k \in [0, K-1]$ are trained using input signals of different types provided by the legitimate users entitled to access to the communication devices of the authentication system.

According to an embodiment, the input signals used to train the server machine learning engine SMLE are the same as those used to train the local machine learning engines LMLEs. When a legitimate user configures its access to its communication device and/or to one or several services provided by its communication device, he is requested to provide input signals for the initial learning phase applied by the local machine learning engine LMLE of its device. According to an embodiment, these input signals are transmitted to the remote server 210 to be used for training the server machine learning engine SMLE. In that case, every legitimate user of a communication device operable in the authentication system provides a plurality of input signals of different types for training the server machine learning engine SMLE.

Once a requesting user is authenticated as legitimate, it is then decided whether or not to run an additional learning phase. According to an example, this decision can be taken by the risk engine 260 taking into account the likelihoods results obtained by the artificial neural networks 220-222 when authenticating the requesting user.

When it is decided to run an additional learning phase, at least one of the input signal S_1 provided by the requesting user authenticated as legitimate and for which an associated likelihood is for example below an identification threshold is transmitted 240 to the remote server 210 for being processed by the server machine learning engine SMLE. The artificial neural network of the server machine learning engine SMLE adapted to process input signal of the type of S_1 is configured to identify at least one user known by the remote server 210 and different from the requesting user authenticated as legitimate by the communication device 200 which best matches with the input signal S_1. This identified user is designated as the closest candidate in the sequel.

For example, the server machine learning engine SMLE is configured to provide for each of the users which is different from the requesting user and known by the authentication system a estimation of the likelihood that they could provide an input signal similar to S_1. When at least one of the closest candidate is identified by the remote server, an input signal S_2 associated to said at least one of the closest candidate is provided and transmitted 250 to the communication device 200.

The input signal S_2 is for example memorized by the server machine learning engine SMLE, or in a database accessible from the server machine learning engine SMLE. According to an embodiment, the input signals such as S_2 which are memorized or accessible by the SMLE are provided by the users of the authentication system during the initial learning phase.

This input signal S_2 is then used as a training stimulus by the local machine learning engine LMLE during an additional learning phase. The local machine learning engine is informed either implicitly or explicitly that the received input signal S_2 is not a signal which is associated to the legitimate user authenticated by the communication device 200. Following the execution of this additional learning phase, the authentication procedure will be more efficient.

Figure 3:
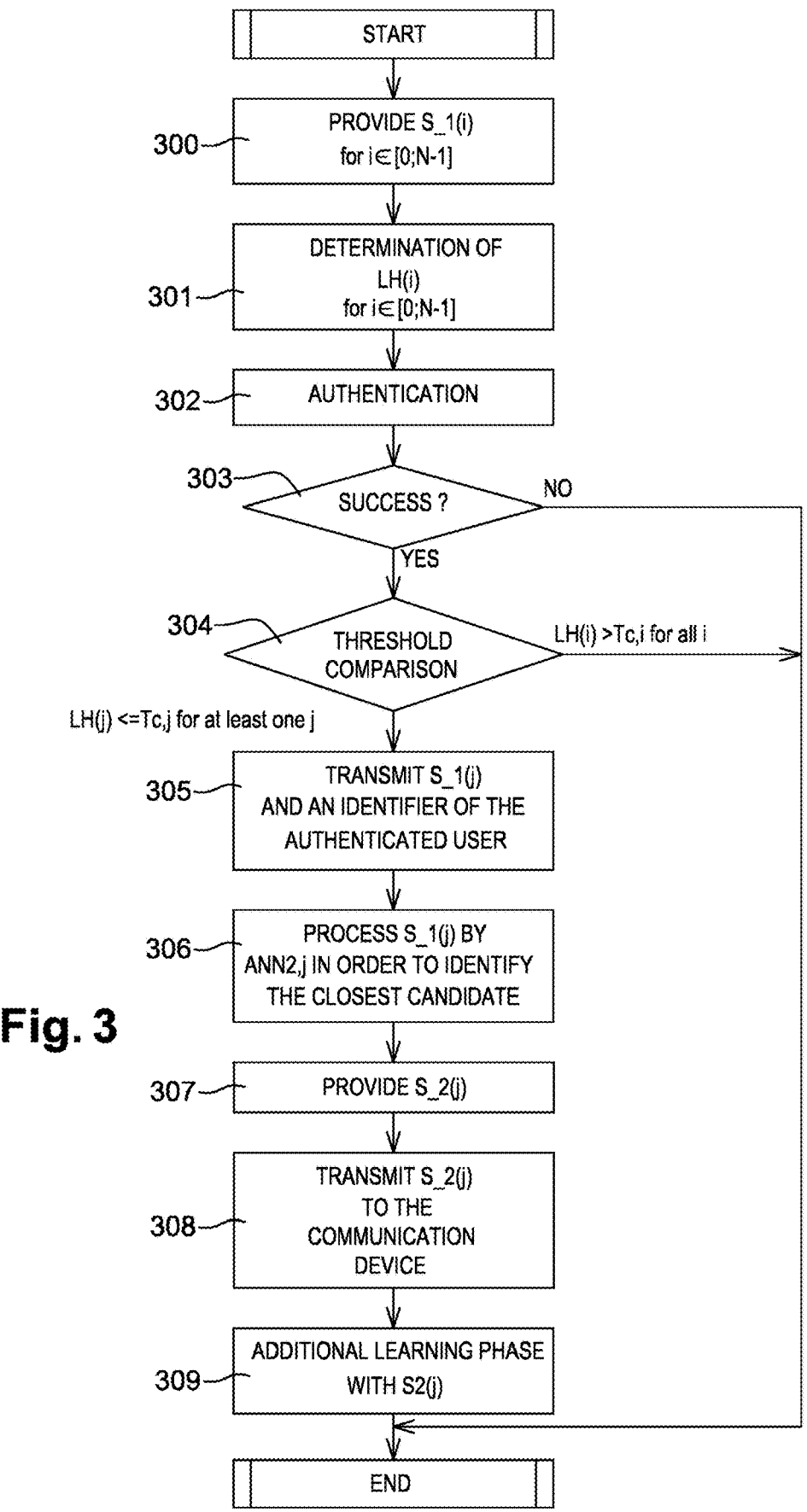
FIG. 3 is an example of flowchart implementing a method for authenticating a user using a distributed machine learning engine.

FIG. 3 is an example of flowchart implementing a method for authenticating a user using a distributed machine learning engine.

As illustrated previously, a communication device embeds a local machine learning engine LMLE. The local machine learning engine comprises a set of M artificial neural networks which are configured to process input signals provided by a requesting user for authentication purpose.

These M artificial neural networks can be improved during one or several additional training phases using input signals provided by a second machine learning engine SMLE implemented remotely in the server.

When it is needed to authenticate a requesting user, N input signals are used. These signals correspond to N stimuli provided 300 by the requesting user thanks to one or several sensors or interfaces implemented by the communication device. These stimuli can also be provided by another device exchanging data with the communication device. According to an example, three input signals are provided to the local machine learning engine:
- a voice signal captured by a microphone of the communication device;
- a gait signal representative of the user's gait captured for example by a video camera capable of exchanging data with the communication device and installed in the user vicinity;
- a fingerprint signal captured by a fingerprint sensor implemented on the communication device.

The skilled person will appreciate this list is not limitative and that other types or combinations of input signals can also be considered. Input signals carrying biometric data are particularly useful, but other types of data can also be advantageously used. For example, environmental signals such as wireless network access points identifiers or names, location positioning, behavioural information from the user or from the device, other device's static or dynamic characteristics such as thermic dissipation signals or noise signals.

The combination of input signals depends of the capability of the communications device and of data availability for generating these signals. For example, for the gait analysis, an input signal of sufficient duration is needed. If the available data is sufficient for providing an input signal that is long enough for an accurate gait analysis, it will not be taken into account.

As a summary, the local machine learning engine LMLE is adapted to process up to M inputs signals for authentication purpose. However, N≤M input signals may be used in practice, as some input signals may not be available at the time of authenticating the requesting user.

The local machine learning engine LMLE is composed of M artificial neural networks. Each of the M artificial neural networks is adapted to detect if a given type of input signal is likely to correspond to the legitimate user of the communication device. These M artificial neural networks are noted $ANN1,k$ with $k \in [0, M-1]$ and are trained for recognizing the legitimate user.

The learning phase of each of the M artificial neural networks is not described there and can be implemented using prior art methods.

At the time of authenticating a requesting user as legitimate, N input signals of different types are provided 300 and noted $S\_1(i)$ with $i \in [0, N-1]$.

Each of the i-th input signal is processed 301 by its corresponding artificial neural network in order to obtain an estimation of the likelihood that it has been provided by the legitimate user:

$$LH(i) = ANN1,i(S\_1)(i)) \text{ for } i \in [0, N-1]$$

The likelihood LH(i) corresponds to the output data provided by $ANN1,i$ when $S\_1(i)$ is used as an input signal.

At this stage, a risk engine possibly implemented in the local machine learning engine LMLE is able to authenticate 302 the requesting user as legitimate. Several alternatives can be used for that purpose.

For example, a cumulative likelihood can be used:

$$C_{LH} = \sum_{i=1}^{N-1} LH(i)$$

Then, the cumulative likelihood $C_{LH}$ can compared to an authentication threshold $T_{AUTH}$. If $C_{LH}$ is greater than $T_{AUTH}$, the requesting user is authenticated as legitimate. If $C_{LH}$ is lower or equal to $T_{AUTH}$, authentication fails.

Other alternatives can also be considered to authenticate the requesting user. For example, each of the N likelihood LH(i) can be compared to a specific threshold $T_{AUTH\_S,i}$ to which it is associated, the threshold value depending of the type of stimulus carried by the corresponding input signal. The requesting user can be considered authenticated when at least P of the N likelihood LH(i) provided by the N artificial neural networks are greater than their corresponding threshold $T_{AUTH\_S,i}$ $i \in [0, N-1]$. If there is less than P likelihood LH(i) which are greater than their corresponding threshold $T_{AUTH\_S,i}$, the authentication of the requesting user fails.

In addition to the authentication process provided by the local machine learning engine LMLE, in particular in case of a failed authentication, an additional authentication mechanism can be implemented.

For example, an additional authentication mechanism using a password and a username can be set up. Alternatively, this second authentication mechanism can be based on a combination of a fingerprint and a password. The skilled person will appreciate that other well-known methods can be used for implementing this additional authentication.

If the requesting user is not authenticated as legitimate, he is not allowed to access to the communication device and/or to the requested service.

When 303 the requesting user is authenticated as legitimate, the local machine learning engine LMLE can be improved with an additional learning phase which is set up thanks to the server machine learning engine SMLE.

For that purpose, the N likelihoods LH(i) are compared 304 to N threshold values $T_{C,i}$. Each threshold value $T_{C,i}$ is adapted to its corresponding artificial neural network $ANN1,i$ and the type of input signals it is supposed to process. According to an embodiment, $T_{C,i}$ can be identical to the threshold $T_{AUTH\_S,i}$ used for the authentication:

$T_{C,i} = T_{AUTH\_S,i}$

Based on a comparison between the N likelihoods LH(i) and the N corresponding thresholds $T_{C,i}$, it is verified 304 if there is at least one j for which $LH(j) < T_{c,j}$. This is a condition to request the support of the server machine learning engine SMLE and executing an additional learning phase by the local machine learning engine LMLE.

According to another example, the support of the server machine learning engine SMLE is requested if is detected 304 that there is at least K j for which $(j) < T_{C,j}$, with K>1.

If this condition is fulfilled, the at least one input signal S_1 (j) for which threshold $T_{C,j}$ is not reached is transmitted 305 to a server machine learning engine SMLE. According to an embodiment, the input signal S_1 (j) is transmitted together with an identifier of the legitimate user. It can be for example its name, its phone number, an email address or any other type of identifier allowing the SMLE to identify the user transmitting the input signal S_1 (j).

The server machine learning engine SMLE comprises a set of M artificial neural networks noted ANN2,k with k ∈ [0, M-1]. Each artificial neural networks ANN2,k is trained with input data provided by all the users of the authentication system.

Each of the M artificial neural networks noted ANN2,k is adapted to process an input signal received from a communication device used by a requesting user U_A authenticated as legitimate, and as a result to identify 306 a candidate user U_C which is different from U_A and for which the transmitted input signal provides the best matching results. Said differently, S_1 (j) is used as an input signal by ANN2,k and it is one of the input signal allowing the identification of user U_C. Then, an input signal S_2 (j) provided by the server machine learning engine SMLE and corresponding to the user U_C is retrieved from a signal database and provided 307 and transmitted 308 to the communication device. This signal database is maintained in the remote server 210 implementing the server machine learning engine SMLE, or is alternatively maintained in another server accessible by the remote server 210.

S2(j) is transmitted 308 to the communication device without any identification information allowing user U_A to identity user U_C. This advantageously protect the privacy of the authentication system users. S_2 (j) is then used 309 by the local machine learning engine LMLE as a learning signal that is not identifying U_A for training ANN1,j to better differentiate the legitimate user providing an input signal S_1 (j) from another.

The invention claimed is:

1. A method for improving user authentication efficiency performed by a communication device belonging to an authentication system, the communication device comprising a local machine learning engine comprising a set of N artificial neural network ANN1, i adapted to process N different types of input signals, the method comprising the following steps:
receiving a first set of N input signals S_1(i) of different types provided by the requesting user for authentication purpose;
determining respectively for each of the N input signals S_1(i) by the N artificial neural networks ANN1, i, N estimations LH(i) of the likelihood that a given input signal is provided by a legitimate user allowed to access to at least a service provided by the communication device;
determining based on a risk scoring established using the N estimations LH(i) if the requesting user is authenticated as the legitimate user;
if the requested user is authenticated, determining if at least one likelihood estimation determined for a given input signal S_1(j) is below a predetermined threshold $T_{c,i}$, and upon determining that at least one likelihood estimation determined for a given input signal S_1(j) is below a predetermined threshold $T_{c,i}$:
transmitting the input signal S_1(j) to a remote server implementing a server machine learning engine adapted to process said N different types of input signals and trained to identify a user U_C, called closest candidate, different from the requesting user and for which the transmitted input signal S_1(j) provides the best matching result, the remote server then providing an input signal S_2(j) associated to the closest candidate U_C and of the same type as S_1(j);
receiving the input signal S_2(j) associated to the closest candidate U_C and executing by the local machine learning engine an additional learning phase using the input signal S_2(j) as an input signal that is not associated to the requesting user.

2. The method according to claim 1, wherein the N artificial neural networks ANN1, i are trained during an initial learning phase applied prior to the additional learning phase at the time of setting up the access of the legitimate user to the communication device using a second set of input signals provided by the legitimate user.

3. The method according to claim 2, comprising the step applied after the initial learning phase of transmitting the second set of input signals to the server machine learning engine for training the server machine learning engine.

4. The method according to claim 3, wherein the second set of input signals is stored in a database where other sets of input signals provided by different users of the authentication system are also stored, these sets of input signals being used for setting up the additional learning phases of a plurality of communication devices belonging to the authentication system.

5. The method according to claim 1, wherein at least one of the N input signals S_1(i) is voice signal captured by a microphone of the communication device.

6. The method according to claim 1, wherein at least one of the N input signals S_1(i) is a gait signal representative of the user's gait.

7. The method according to claim 6, wherein the gait signal is captured by a video camera capable of exchanging data with the communication device and installed in the user vicinity.

8. The method according to claim 1, wherein at least one of the N input signals S_1(i) is a fingerprint signal captured by a fingerprint sensor implemented on the communication device.

9. The method according to claim 1, wherein at least one of the N input signals S_1(i) is environmental signals such as wireless network access point identifiers.

10. The method according to claim 1, wherein the input signal S_2(j) is received is received by the communication device without any identification information allowing the identification of the user to which the input signal S_2(j) is associated.

11. A communication device belonging to an authentication system, the communication device comprising a local machine learning engine comprising a set of N artificial neural network ANN1, $i$ adapted to process N different types of input signals, the communication device being configured to:

receive a first set of N input signals S_1($i$) of different types provided by the requesting user for authentication purpose;

determine respectively for each of the N input signals S_1($i$) by the N artificial neural networks ANN1, $i$, N estimations LH(i) of the likelihood that a given input signal is provided by a legitimate user allowed to access to at least a service provided by the communication device;

determine based on a risk scoring established using the N estimations LH(i) if the requesting user is authenticated as the legitimate user;

if the requested user is authenticated, determining if at least one likelihood estimation determined for a given input signal S_1($j$) is below a predetermined threshold $T_{c,i}$, and upon determining that at least one likelihood estimation determined for a given input signal S_1($j$) is below a predetermined threshold $T_{c,i}$:

transmit (305) the input signal S_1($j$) to a remote server implementing a server machine learning engine adapted to process said N different types of input signals and trained to distinguish input signals provided by a plurality of users of the authentication system, a candidate user U_C different from the requesting user for which the transmitted input signal S_1($j$) provides the best matching results being identified, a corresponding input signal S_2($j$) associated to the candidate user U_C and of the same type as S_1($j$) being provided;

receive the input signal S_2($j$) associated to the candidate user U_C and executing by the local machine learning engine an additional learning phase using the input signal S_2($j$) as an input signal that is not associated to the requesting user.

12. An authentication system comprising a communication device and a remote server comprising means for carrying out the steps of a method for improving user authentication efficiency performed by a communication device belonging to an authentication system, the communication device comprising a local machine learning engine comprising a set of N artificial neural network ANN1, $i$ adapted to process N different types of input signals, the method comprising the following steps:

receiving a first set of N input signals S_1($i$) of different types provided by the requesting user for authentication purpose;

determining respectively for each of the N input signals S_1($i$) by the N artificial neural networks ANN1, $i$, N estimations LH(i) of the likelihood that a given input signal is provided by a legitimate user allowed to access to at least a service provided by the communication device;

determining based on a risk scoring established using the N estimations LH(i) if the requesting user is authenticated as the legitimate user;

if the requested user is authenticated, determining if at least one likelihood estimation determined for a given input signal S_1($j$) is below a predetermined threshold $T_{c,i}$, and upon determining that at least one likelihood estimation determined for a given input signal S_1($j$) is below a predetermined threshold $T_{c,i}$:

transmitting the input signal S_1($j$) to a remote server implementing a server machine learning engine adapted to process said N different types of input signals and trained to identify a user U_C, called closest candidate, different from the requesting user and for which the transmitted input signal S_1($j$) provides the best matching result, the remote server then providing an input signal S_2($j$) associated to the closest candidate U_C and of the same type as S_1($j$);

receiving the input signal S_2($j$) associated to the closest candidate U_C and executing by the local machine learning engine an additional learning phase using the input signal S_2($j$) as an input signal that is not associated to the requesting user.

13. The authentication system according to claim 12, wherein the N artificial neural networks ANN1, $i$ are trained during an initial learning phase applied prior to the additional learning phase at the time of setting up the access of the legitimate user to the communication device using a second set of input signals provided by the legitimate user.

14. The authentication system according to claim 13, comprising the step applied after the initial learning phase of transmitting the second set of input signals to the server machine learning engine for training the server machine learning engine.

15. The authentication system according to claim 14, wherein the second set of input signals is stored in a database where other sets of input signals provided by different users of the authentication system are also stored, these sets of input signals being used for setting up the additional learning phases of a plurality of communication devices belonging to the authentication system.

16. The authentication system according to claim 12, wherein at least one of the N input signals S_1($i$) is voice signal captured by a microphone of the communication device.

17. The authentication system according to claim 12, wherein at least one of the N input signals S_1($i$) is a gait signal representative of the user's gait.

18. The authentication system according to claim 17, wherein the gait signal is captured by a video camera capable of exchanging data with the communication device and installed in the user vicinity.

19. The authentication system according to claim 12, wherein at least one of the N input signals S_1($i$) is a fingerprint signal captured by a fingerprint sensor implemented on the communication device.

20. The authentication system according to claim 12, wherein at least one of the N input signals S_1($i$) is environmental signals such as wireless network access point identifiers.

21. The authentication system according to claim 12, wherein the input signal S_2($j$) is received is received by the communication device without any identification information allowing the identification of the user to which the input signal S_2($j$) is associated.

22. A non-transitory computer memory storing a computer program product comprising instructions which, when the program is executed by a computer, cause the computer to carry out the steps of a method for improving user authentication efficiency performed by a communication device belonging to an authentication system, the communication device comprising a local machine learning engine comprising a set of N artificial neural network ANN1, $i$ adapted to process N different types of input signals, the instructions comprising instructions to cause the computer to perform the following steps:

receiving a first set of N input signals S_1($i$) of different types provided by the requesting user for authentication purpose;

determining respectively for each of the N input signals S_1(i) by the N artificial neural networks ANN1, i, N estimations LH(i) of the likelihood that a given input signal is provided by a legitimate user allowed to access to at least a service provided by the communication device;

determining based on a risk scoring established using the N estimations LH(i) if the requesting user is authenticated as the legitimate user;

if the requested user is authenticated, determining if at least one likelihood estimation determined for a given input signal S_1(j) is below a predetermined threshold $T_{c,i}$, and upon determining that at least one likelihood estimation determined for a given input signal S_1(j) is below a predetermined threshold $T_{c,i}$:

transmitting the input signal S_1(j) to a remote server implementing a server machine learning engine adapted to process said N different types of input signals and trained to identify a user U_C, called closest candidate, different from the requesting user and for which the transmitted input signal S_1(j) provides the best matching result, the remote server then providing an input signal S_2(j) associated to the closest candidate U_C and of the same type as S_1(j);

receiving the input signal S_2(j) associated to the closest candidate U_C and executing by the local machine learning engine an additional learning phase using the input signal S_2(j) as an input signal that is not associated to the requesting user.

* * * * *